United States Patent [19]

Phaup

[11] 4,171,550
[45] Oct. 23, 1979

[54] LOADING SYSTEM
[75] Inventor: Charles W. Phaup, Dallas, Tex.
[73] Assignee: JBC Enterprises, Inc., Houston, Tex.
[21] Appl. No.: 908,085
[22] Filed: May 22, 1978
[51] Int. Cl.$^2$ .................................................. E01D 1/00
[52] U.S. Cl. .......................................... 14/71.1; 61/48; 182/82
[58] Field of Search ...................... 14/69.5, 71.1, 72.5; 214/14, 85; 61/48; 182/82

[56] References Cited
U.S. PATENT DOCUMENTS

| 1,674,279 | 6/1928 | Ebeling | 14/69.5 |
| 1,723,885 | 8/1929 | Patterson | 14/71.1 |
| 2,372,574 | 3/1945 | Haynes | 14/71.1 |
| 2,527,653 | 10/1950 | Pierce | 14/71.1 |
| 2,617,131 | 11/1952 | Harris | 14/71.1 |
| 3,023,831 | 3/1962 | Bevis | 182/82 |
| 3,413,671 | 12/1968 | Conner | 14/71.1 |
| 4,003,473 | 1/1977 | Ryan | 14/71.1 X |

OTHER PUBLICATIONS

L.P. Gas Industrial Equipment Co. Brochure (1 pg), 4/24/78.
Ferguson Industries, Two Page Brochure.
Hemco Industries, Inc., Four Page Brochure.

Primary Examiner—Nile C. Byers, Jr.

[57] ABSTRACT

There is disclosed a modular system comprising central platforms having additional platforms extending from the ends thereof, and walkways pivotally connected to opposite sides of the central platform for swinging between horizontal positions for use in loading containers along the sides of the platforms, and tilted, out-of-the-way positions.

5 Claims, 4 Drawing Figures

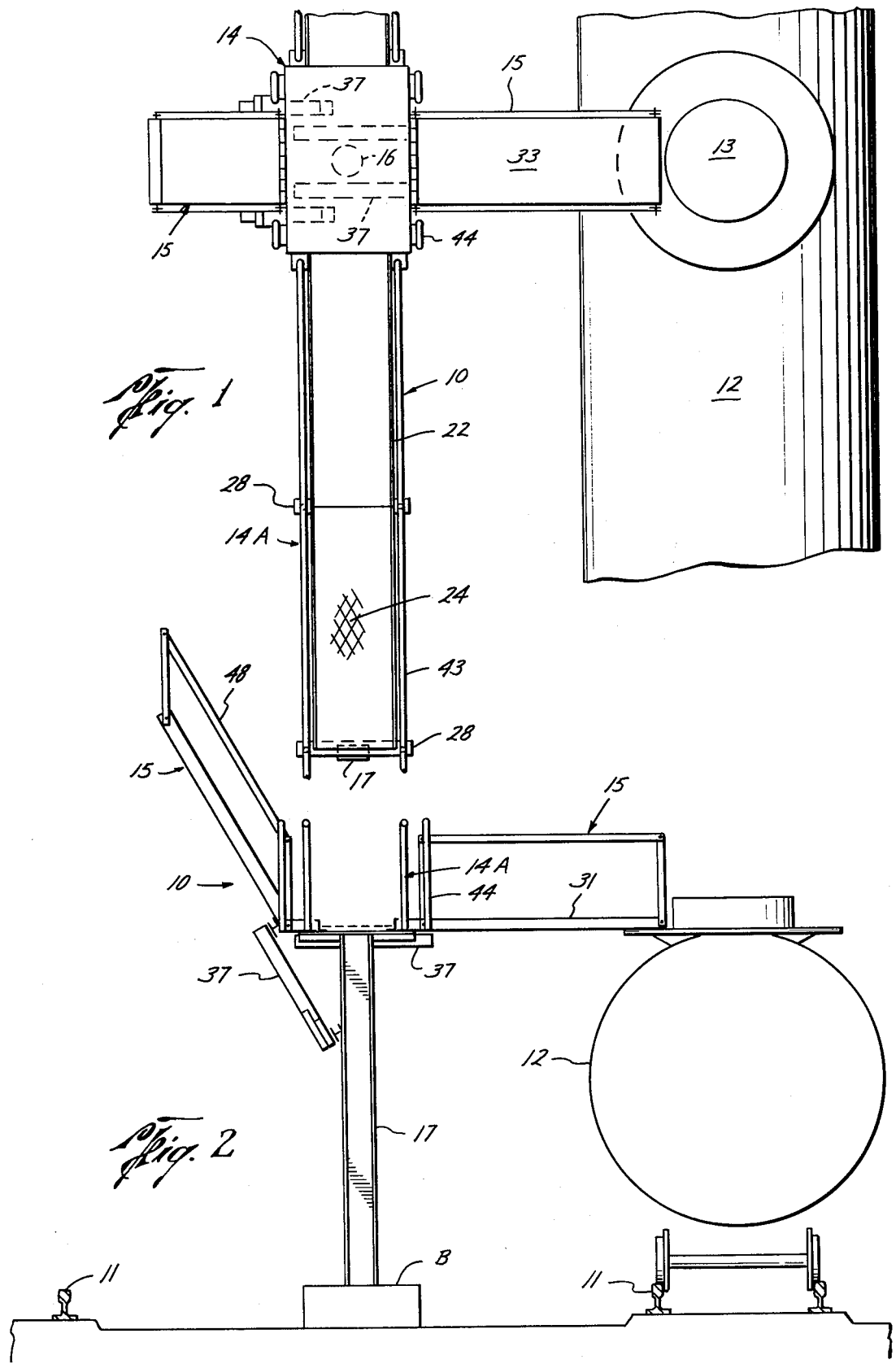

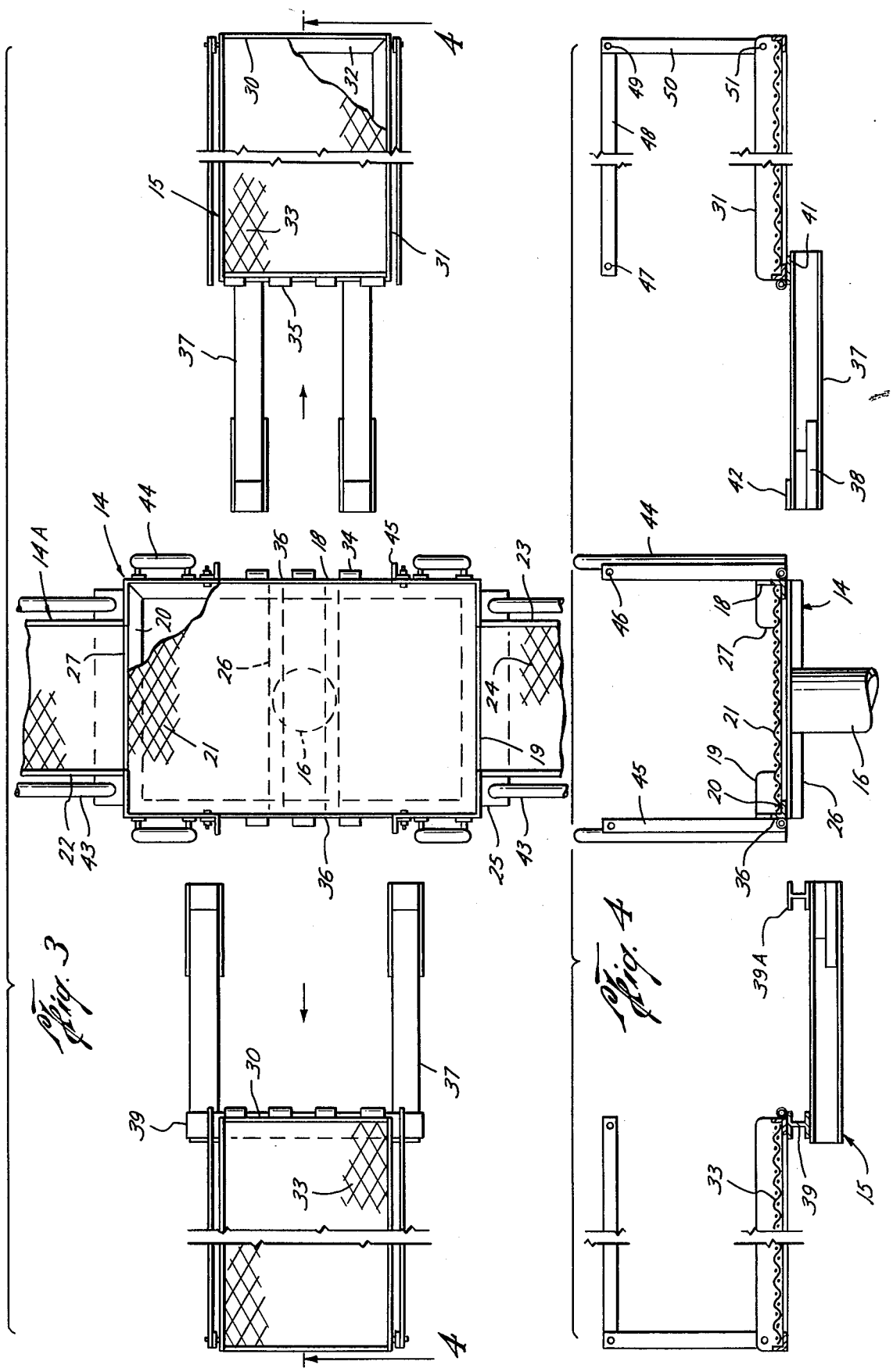

LOADING SYSTEM

This invention relates to improvements in systems for loading containers, such as tank cars, trucks, or the like.

In prior systems of this type, an elevated platform extends parallel to one side of a track or line of trucks, or other containers so as to support personnel in position to handle and make the necessary connection of hoses with access openings in the containers. The platform is usually long in order to permit the loading of several containers, and requires the assembly of its individual parts on location, which is a time-consuming and labor-expensive procedure. Also, these parts include walkways which may be swung into positions extending laterally from a central platform to a point near each container, and, in prior systems, the means for so swinging and supporting these walkways has been complex.

An object of this invention is to provide a loading system of this type which is modular in construction so that it requires a minimum of parts to be assembled on location.

Another object is to provide such a system having modules of simple construction, and, in particular, a walkway which is supported from the central platform in a simple and secure manner.

These and other objects are accomplished, in accordance with the illustrated embodiment of the invention, by a loading system which comprises a central platform having a floor supported by a column in an elevated position to one side of the container to be loaded, and additional platforms each having a floor supported by columns on each end of the central platform. The columns and platforms are longitudinally aligned parallel to the track or line of trucks or other containers, and the ends of adjacent platforms are connected to one another with their floors substantially flush with one another.

More particularly, each walkway has its inner end mounted on one side of the central platform for movement between a generally horizontal position in which its outer end is near the container and another position in which its outer end is raised and withdrawn from the container, and has a floor which is substantilly flush with that of the central platform in its horizontal position.

More particularly, each of the platforms and walkways may be constructed before delivery to the location, and, for this purpose, is of a box-like construction having side and end walls bounding and extending above the floor, the adjacent side and end walls of the central platform and walkway, and the adjacent end walls of the platforms, being recessed to the floor level, thereby providing "kick plates," where needed, but clear access without obstruction through areas which personnel pass.

In the preferred and illustrated embodiment of the invention, the walkway has an inner end which is pivotally mounted on one side wall of the platform for swinging between horizontal and tilted positions, and an elongate arm is mounted on the bottom of the walkway and extends inwardly from its inner end for engaging the bottom of the platform when the walkway is in its horizontal position. More particularly, a counterweight is carried by the arm near its outer end so as to urge the walkway toward its tilted position, and a means may be provided for locking the walkway in the tilted position. The arm is prefereably an I-beam, and the counterweights include weights carried on the I-beam on both sides of its web.

In accordance with the preferred and illustrated embodiment of the invention, wherein the loading system is disposed between two tracks or lines of trucks or other containers, a pair of walkways are individually mounted on opposite sides of each platform. Each walkway carries a pair of elongate arms, with the arms on one of the walkways being laterally offset with respect to the arms on the other walkway so as to permit them to extend in spaced-apart, side-by-side relation when engaged with the bottom of the platform. More particularly, the pair of arms mounted on each walkway extend symmetrically of the width thereof, with one pair being arranged laterally within the other so as to enable them to move past one another between tilted and horizontal positions.

In the drawings, wherein like reference characters are used throughout to designate like parts:

FIG. 1 is a plan view of part of a loading system including a central platform with walkways on each side thereof, with one of the walkways in its horizontal position for access to a tank car to one side thereof and the other tilted to an out-of-the-way position;

FIG. 2 is an elevational view of the system tank car, as seen in FIG. 1;

FIG. 3 is an exploded view, on an enlarged scale, of part of the system of FIGS. 1 and 2, including the central platform, the walkways on each side thereof, and portions of the additional platforms connected to the ends of the central platform; and FIG. 4 is an exploded elevational view of the parts of the system of FIG. 3.

With reference now to the details of the above-described drawings, the overall system, which is indicated in its entirety by reference character 10, is shown to be mounted intermediate and generally parallel to tracks 11 on which tank cars, such as the tank car 12, may be spotted. The tank car has a hatch 13 on its upper end through which it may be loaded by means of suitable hoses and conduits mounted on and manipulated from the platform 10. For purposes of simplicity, the conduits and their assembly on the loading system are not shown in the drawings.

As previously described, the system includes an elongate platform having one or more central platforms 14 and additional platforms 14A extending between the central platforms. More particularly, and as also previously described, the platforms are connected in end-to-end relation, and walkways 15 are connected to one or both sides of each central platform to provide access to an adjacent container, in this case to containers on one or both sides of the system —i.e., tank cars on one or both of the tracks 11.

The entire system is modular in the sense that each of the central and additional platforms and the walkways may be preassembled before delivery to the location. Thus, each platform is supported on a column 16 for raising it to the proper elevation relative to the ground surface, and thus to the hatch or access opening in the tank car. Column 16 for the central platform 14 is circular in cross section and of heavy duty construction since it carriers more load than the additional platforms. The additional platforms 14A are supported from columns 17 comprising I-beams located at the intersection between adjacent additional platforms. Ordinarily, there are several additional platforms between central platforms, and the additional platforms adjacent the central platforms have their inner ends supported from the central platform, with their outer ends supported, together with one end of the next adjacent additional platform, upon the first outboard column 17.

Personnel have access to the platforms and walkways by means of ladders (not shown) which may be mounted on the sides of the additional platforms, or upon a central platform as at one end thereof or the side thereof opposite one walkway. Each of the columns 16 and 17 is preferably mounted on a concrete base B which may be precast and spotted at spaced-apart locations during assembly of the modular parts of the system. The lower ends of the columns would, of course, be anchored to the concrete bases prior to mounting of the platforms on the upper end of the columns.

Although all of the platforms are rectangular in plan, each central platform 14 is wider and shorter than the additional platforms 14A, and thus provides a larger work area to and from the walkways 15. As best shown in FIGS. 3 and 4, each platform 14 is of box-like construction having side and end walls 18 and 19 in the form of angles interconnected at their opposite ends to form a lower ledge or shelf 20 about the box. Suitable grating 21 is supported upon and fixed to the shelf so as to provide a floor for the box within the boundary of its end and side walls. The upper end of the floor is beneath the upper ends of the angle forming the ends of the side walls so as to provide kick plates or toe guards about portions of the interior of each central platform, as will be described more fully to follow.

Each additional platform 14A is of even simpler construction in that it is made up of prefabricated channels 22 having side walls 23 with suitable grating 24 extending therebetween to form a floor for each additional platform. The inner ends of the additional platforms adjacent the central platform are supported on flanges or the like 25 secured to each end wall 19 of the central platform at such an elevation that the grating 21 and 24 providing the floors of the central and additional platforms are substantially flush with one another. Angles or other members 26 are secured to the lower ends of the side walls 18 of the central platform and extend thereacross to provide a base by which the central platform is secured to the upper end of column 16.

The ends of the additional platforms are supported, as shown in FIG. 1, upon flanges 28 secured to the upper ends of the columns 17. More particularly, the columns 17 are so spaced that the intersection between adjacent additional platforms is approximately midway the width of the angles 26. Furthermore, since each of the additional platforms is identical in construction, their floors are flush with one another, and thus with the central platform 14.

Unobstructed passage is provided between the central platform and each additional platform by recesses 27 formed in the end walls 19 of the central platforms. As best shown in FIGS. 3 and 4, each such recess is of a width corresponding to the width of each additional platform, and of a depth to the top of the floor of the grating 21, and thus the grating 24 of the additional platform.

Each of the walkways 15 is of substantially the same box-like construction as the central platform 14 to which it's connected. Ordinarily, the walkway is longer than the platform 14 and, as shown in the drawings, is of a length less than that of the walkway with its inner end wall connected to the adjacent side wall of the central platforms generally symmetrically of the opposite ends of the platforms.

Thus, walkway 15 is made up of a box comprising end walls 30, and side walls 31 in the form of angles having their ends connected together to form a shelf 32 within the box for supporting grating 33 which provides the floor of the walkway.

The inner end wall 30 of each box is connected to the adjacent side wall 18 of the box of the central platform by means of hinges including spaced-apart journals 34 welded to the lower end of the angle forming side wall 18 and interfitting journals 35 welded to the inner end wall 30 of the walkway toward the lower end of the angle forming same. Thus, with the journals interfitted, a pin can be inserted through aligned openings to form the pivotal connection which permits the walkway to swing between the horizontal position of the righthand walkway and the tilted position of the lefthand walkway, as shown in FIGS. 1 and 2.

Each side wall 18 of the central platform 14 is recessed at 36, the recess being somewhat wider than the width of the walkway so that the inner end of the walkway is free to swing inwardly as it is moved to tilted position. More particularly, the lower end of recess 36 is level with the floor provided by the grating 21, and the floor provided by the grating 33 is flush with the floor provided by the grating 21, when the walkway is in its horizontal position, so as to provide unobstructed access therebetween.

Each walkway 15 is supported from the central platform as a cantilever by means of arms 37 which are connected to the lower side of the inner end of each walkway and extend in spaced-apart relation lengthwise of the walkway for engaging the bottom of the central platform when the platform is swung to the horizontal position of FIGS. 1 and 2. More particularly, each such arm is an I-beam to the opposite sides of the web of which weights 38 may be removably secured in any suitable fashion.

As shown, the weights are connected at the free ends of the arms so that when the arms swing downwardly, as the walkway is tilted upwardly, the weights act as a counterweight to urge the walkway toward its tilted position, and thereby reduce the force required to move them into and maintain them tilted. The walkway may be locked in its tilted position by any suitable means (not shown), such as a chain extending between the walkway and a fixed part of the central portion, or locking pins extending between these two parts, or any other suitable arrangement.

In the preferred and illustrated embodiments of the invention, the arms on the left and righthand walkways shown in FIGS. 3 and 4 are laterally offset from one another so as to avoid interfering with one another as the walkways are swung between tilted and horizontal positions. Preferably, the arms 37 of the righthand walkway are arranged symmetrically of the width of the walkway but within the sides thereof, and thus relatively close together. The arms of the lefthand walkway, on the other hand, are connected to the bottom thereof in wider spaced-apart relation, although symmetricaly with respect to the sides of the walkway, so that they will swing in paths outside of the arms of the righthand walkway. In any event, this lateral offsetting of the arms enables them to be of lengths greater than one-half the width of the central platform, and thus to dispose the counterweights in a desired dependent position in the tilted position of the walkway. In order to space the arms 37 of the lefthand walkway outwardly of the sides thereof, they are connected to the bottom of the inner end of the lefthand walkway by means of an I-beam 39 extending laterally beyond the opposite sides of the walkway. As shown, another I-beam 39A is connected to the top of the inner end of the I-beam so that its top flange will engage the bottom of the central platform to hold the lefthand walkway in the horizontal position. In addition to providing the needed support for the arms 37, the I-beams 39 and 39A act as spacers so as to drop the tops of the arms beneath the hinge pin journals, and thus prevent any binding or interference with swinging of the lefthand walkway into its horizontal position. For this same purpose, the arms 37 of the righthand walkway may be connected thereto by means of a spacer 41 on their outer end and a spacer 42 on their inner ends for engaging the bottom of the central platform to hold it in horizontal position.

Suitable handrails 43 may be provided on the side of each of the additional platforms 14A. Similarly, handrails 44 may be mounted on the sides 18 of the central platform for extension generally between the corners thereof and the recesses 36 on the sides thereof.

Handrails are also provided for the walkways 15, although, as distinguished from those of the platforms, the walkway handrails are collapsible, as a parallelogram, so as to prevent their inner ends from moving into and thus interfering with the interior space of the central platform. For this latter purpose, uprights 45 are bolted or otherwise secured to the side walls 18 of the central platform just inwardly of the side rails 44 of such platform, and outwardly of the opposite sides of the walkways 15. The upper ends of the uprights 45 are provided with holes 46 to receive pivot pins for connecting them with holes 47 in upper handrails 48, which in turn are pinned at 49 to outer rails 50, which have their lower ends pivotally connected to the outer ends of the side walls 31 of walkway 15 by means of pins 51. Thus, the rails 48 and 50 are pivotally connected respectively, to the fixed uprights 45 and to one another so as to permit the handrail to fold as a parallelogram, as indicated in FIG. 2.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A loading system, comprising a central platform having a floor, means for supporting the platform in an elevated position in order to support personnel on the floor to one side of a container to be loaded, a pair of walkways having their inner ends pivotally mounted on opposite sides of the platform for swinging between generally horizontal positions in which their outer ends are near the container and tilted positions in which their outer ends are raised and withdrawn from the container, said walkway having a floor which is substantially flush with the platform floor in its horizontal position, an elongate arm mounted on the bottom of each walkway and extending inwardly of its inner end for engaging the bottom of the platform when the walkway is in its horizontal position, and a counterweight carried by each arm near its outer end so as to urge said walkway toward its tilted position, the elongate arms mounted on the walkways being laterally offset so as to permit them to extend in spaced-apart, side-by-side relation when engaged with the bottom of the platform.

2. A loading system of the character defined in claim 1, wherein there are a pair of elongate arms mounted on each walkway in spaced-apart parallel relation.

3. A loading system of the character defined in claim 2, wherein the pair of arms mounted on each walkway are disposed symmetrically of the side of the platform on which it is mounted, with one pair being arranged laterally within the other pair.

4. A loading system of the character defined in claim 1, wherein the platform and walkway is of box-like construction having side and end walls, the end walls of said walkway and side walls of the platform being pivotally connected by hinges which includes journals fixed thereto adjacent their lower ends, and spacers on the opposite end of the top of each walkway, one connecting the arm to the bottom of the walkway beneath the hinge and the other engaging the bottom of the platform.

5. A loading system, comprising a central platform having a floor, a column supporting the platform in an elevated position to one side of a container to be loaded, additional platforms each having a floor, a column supporting at least one additional platform on each end of the central platform, said columns and platforms being longitudinally aligned, means connecting the ends of adjacent platforms to one another with their floors substantially flush with one another, a walkway having its inner end mounted to one side of the central platform for swinging between a generally horizontal position in which its outer end is near the container and a position in which its outer end is raised and withdrawn from the container, said walkway having a floor which is substantially flush with that of the central platform in its horizontal position, each of the platforms and walkway being of box-like construction having side and end walls bounding and extending above the floor, the adjacent side and end walls of the central platform and walkway, and the adjacent end walls of the platforms, being recessed to the floor level.

* * * * *